(No Model.)
C. A. MASTERSON.
CHECK ROW CORN PLANTER.
No. 304,336. Patented Sept. 2, 1884.
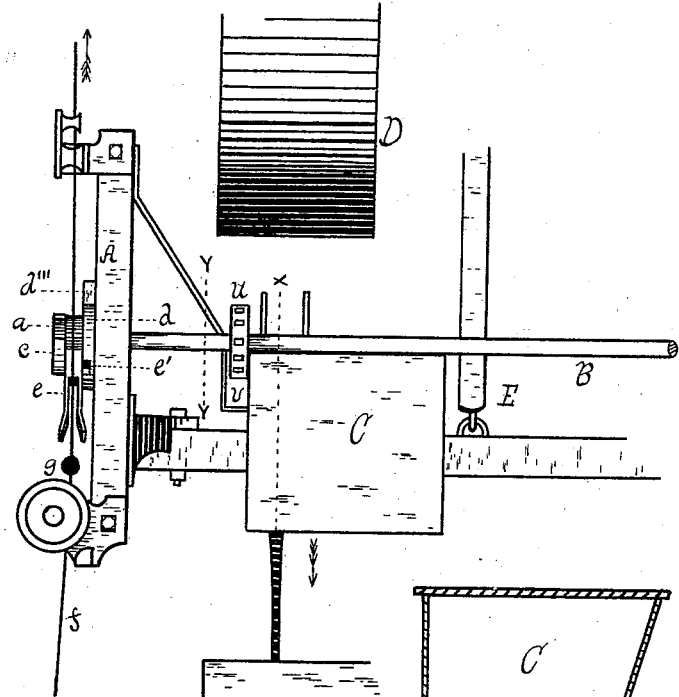
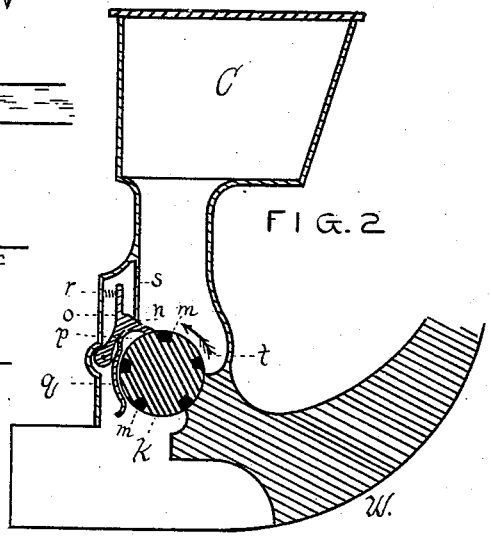
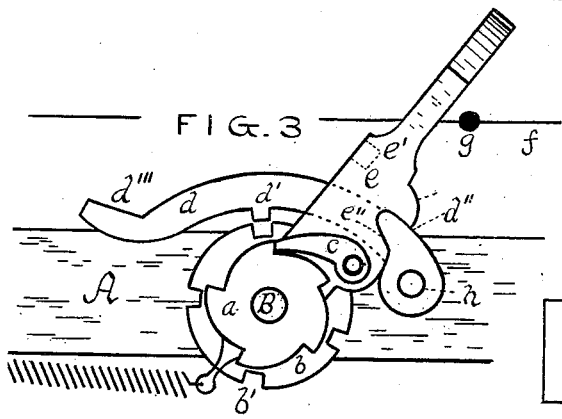
Witnesses
J. N. Bills
C. C. Clark
Inventor
CARSON A. MASTERSON
By L. P. Graham
Atty.

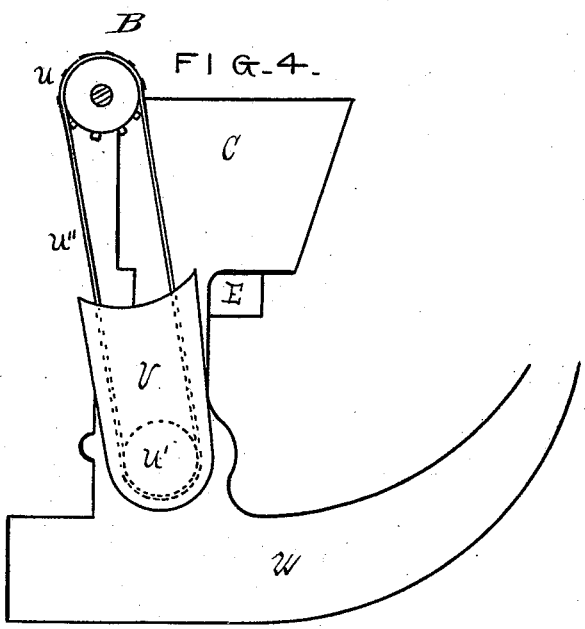

UNITED STATES PATENT OFFICE.

CARSON A. MASTERSON, OF DECATUR, ILLINOIS, ASSIGNOR TO FRANK M. GADDIS, OF SAME PLACE.

CHECK-ROW CORN-PLANTER.

SPECIFICATION forming part of Letters Patent No. 304,336, dated September 2, 1884.

Application filed August 10, 1883. Renewed June 3, 1884. (No model.)

*To all whom it may concern:*

Be it known that I, CARSON A. MASTERSON, a resident of the city of Decatur, county of Macon, and State of Illinois, have invented certain new and useful Improvements in Check-Row Corn-Planters, of which the following is a specification.

My invention relates to that class of check-row corn-planters in which the check-row shaft is intermittently rotated by the check-row wire, and in which vertically-rotating seed-wheels provided with peripheral cells for measuring and depositing the seed are located at downward extensions of the seed-boxes.

My invention consists in the construction and arrangement of the locking device of the check-row shaft, by means of which a single pawl operates as a lock for the shaft and a stop for the tappet, while its motion is entirely positive, being forced in contact with the shaft-ratchet by the forward throw of the tappet and raised by the backward motion of the same.

My invention also consists in providing the seed-wheels of the planter with segmental spring-casings that extend partially around said wheels, and permit the corn which forces its way under the cut-off to pass unharmed to the ground. In vertically-rotating seed-wheels having peripheral cells said cells must fill from above and carry the corn nearly a semi-revolution before depositing the same. Such being the case, a rigid casing will co-operate with the wheel to pulverize all grains that succeed in forcing their way under the cut-off.

Figure 1 is a plan of a side of a corn-planter, showing the general arrangement of my device. Fig. 2 is a sectional view of the drop device and hopper through dotted line $x$ in Fig. 1. Fig. 3 is a side view of the check-row lock; and Fig. 4 is a side view of the seed-box and runner on sectional line $y$ $y$, Fig. 1.

$a$ is a ratchet drive-wheel rigid on check-row shaft B.

$b$ is a lock-ratchet, also rigid on the same shaft.

$d$ is a lock-pawl pivoted to the check-row bar A at $h$, provided with beveled lateral projection $d''$, lock-tooth $d'$, and inclined bearing $d'''$.

$e$ is a bifurcated tappet arranged to oscillate loosely on shaft B between ratchets $a$ and $b$, and provided with lateral projection $e'$ and beveled recess $e''$.

$f$ is the check-row wire, and $g$ a stop thereon.

$k$ is a vertical rotating drop-plate located at the bottom of channel $t$, and provided on its circumference with recesses $m$ $m$.

$n$ $o$ represent a "cut-off" for the drop-plate provided with spiral spring $r$ and curved spring $q$.

$p$ is a cavity, the function of which will be hereinafter explained.

$w$ is the runner or shoe of the planter.

C is the hopper.

D is the wheel, and E a portion of the planter-frame.

$u$ is a sprocket-wheel on shaft B, provided with chain belt $u''$, and connected with sprocket-wheel $u'$, which turns drop-plate $k$.

$v$ is a casing that protects wheel $u'$ and belt $u''$.

In operation tappet $e$ is thrown in one direction by the projections $g$ on wire $f$, and immediately returned by a spring, as indicated. At every oscillation of the tappet, pawl $c$ and ratchet $a$ impart a one-fifth revolution to shaft B. As the tappet moves from the position shown in Fig. 3, projection $d''$ and recess $e''$ are thrown out of contact and pawl $d$ permitted to rest on the rotating ratchet $b$; then as the stroke is completed tooth $d'$ drops into a recess, $b'$, and lateral projection $e$ coming in contact with bearing $d'''$ causes an absolute stop to the tappet and an absolute lock to the shaft. Tooth $d'$ remains in a recess, $b'$, until the tappet has nearly resumed its original position, thus further insuring permanency in the shaft-lock. Tappets and locking devices, as described, are located at each end of the check-row bar, and are used alternately as the planter traverses and retraverses the field. By this arrangement the pawl $c$ of the dormant tappet is used as a stop to back motion in the shaft. The drop-plate $k$ is rotated in the direction of the arrow, and the corn is carried around and deposited by recesses $m$. Grains of corn that catch on the edges of the recesses $m$ and raise the cut-off pass into receptacle $p$, (thus permitting the cut-off to reassume its functions at once,) and finally pass off between spring $q$ and the drop-plate $k$.

It will be readily observed that the operation of the drop-plate and check-rower is simultaneous, a hill of corn being deposited at every stroke of the tappet.

I propose to regulate the amount of corn deposited at each operation by constructing interchangeable drop-plates with various-sized cavities $m\ m$.

I am aware that locks for intermittently rotating shafts have been used in which the lock-pawl was forced in contact with the shaft-ratchet by the forward throw of the tappet, as in patent to Bering, Colborne, and Richmond, No. 215,203; but in this case said pawl was raised by the stop on the wire, and not by direct action of the tappet.

I claim as new and desire to secure by Letters Patent—

1. Tappet $e$, provided with projection $e'$ and recess $e''$, pawl $d$, provided with projections $d'$ $d''$ and inclined surface $d'''$, ratchets $a\ b$, pawl $c$, and shaft B, in combination as and for the purpose set forth.

2. The combination, with a vertically-rotating seed-wheel provided with peripheral cells, of a segmental spring-casing adapted to retain the seed in the cells during a partial rotation and permit the superfluous grains to escape without injury by friction, as set forth.

3. The combination of an intermittently-rotating check-row shaft, vertically-rotating seed-wheels, and connecting sprocket-gear adapted to impart the motion of the check-row shaft to the seed-wheels, as set forth.

CARSON A. MASTERSON.

Attest:
W. M. BOLD,
C. C. CLARK,
FRANK M. GADDIS.

It is hereby certified that Letters Patent No. 304,336, granted September 2, 1884, upon the application of Carson A. Masterson, of Decatur, Illinois, for an improvement in "Check Row Corn Planters," was erroneously issued to "Frank M. Gaddis," as assignee of the entire interest in said invention; that the Letters Patent should have been granted to the said *Carson A. Masterson and Frank M. Gaddis*, as joint owners; and that the proper correction has been made in the files and records pertaining to the case in the Patent Office, and should be read in the Letters Patent to make it conform thereto.

Signed, countersigned, and sealed this 11th day of November, A. D. 1884.

[SEAL.]

M. L. JOSLYN,
*Acting Secretary of the Interior.*

Countersigned:
    BENJ. BUTTERWORTH,
        *Commissioner of Patents.*